(12) United States Patent
Josefsson et al.

(10) Patent No.: US 7,202,807 B2
(45) Date of Patent: Apr. 10, 2007

(54) DYNAMIC ANTENNA

(75) Inventors: Lars Josefsson, Askim (SE); Björn Thors, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/530,474

(22) PCT Filed: Oct. 24, 2002

(86) PCT No.: PCT/SE02/01943

§ 371 (c)(1), (2), (4) Date: Aug. 17, 2005

(87) PCT Pub. No.: WO2004/038863

PCT Pub. Date: May 6, 2004

(65) Prior Publication Data

US 2006/0164281 A1    Jul. 27, 2006

(51) Int. Cl.
*H01Q 17/00* (2006.01)
*H04K 3/00* (2006.01)
*G01S 13/00* (2006.01)

(52) U.S. Cl. ............... 342/14; 342/13; 342/20; 342/73; 342/74; 342/175; 342/195

(58) Field of Classification Search ........... 342/1–20, 342/42–51, 175, 195, 73, 74; 343/705, 860–864; 333/81 R, 81 A, 81 B
See application file for complete search history.

(56) References Cited

U.S. PATENT DOCUMENTS

| | | | |
|---|---|---|---|
| 3,568,194 A | 3/1971 | Wilson et al. | |
| 4,117,485 A | 9/1978 | Gorr et al. | |
| 4,155,087 A * | 5/1979 | Okrent | 342/6 |
| 4,682,176 A | 7/1987 | Jones | 342/175 |
| 4,989,006 A * | 1/1991 | Roth | 342/1 |

(Continued)

FOREIGN PATENT DOCUMENTS

WO        02/011239 A3       2/2002

OTHER PUBLICATIONS

K.M. Chen et al., "Minimization of Backscattering of a Metallic Loop by Impedance Loading"; IEEE Transactions on Antennas and Propagation; May 1967; pp. 492-494.*

(Continued)

*Primary Examiner*—Bernarr E. Gregory
(74) *Attorney, Agent, or Firm*—Nixon & Vanderhye P.C.

(57) ABSTRACT

A method and an antenna arrangement are disclosed for reducing the antenna radar cross section for an externally illuminating radar source. A radar pulse is transmitted with the antenna arrangement fully matched to achieve a lowest possible power loss of the pulse. At all other times the antenna will be poorly matched and thereby will act as a low radar cross section. The reduced radar cross section leads to an antenna gain reduction, which most often can be accepted since competing noise is reduced as much as the useful signal. It is further suggested that the range gate of the receiver and the transmitter pulse control the antenna. Thus, the antenna is "fully opened" during the transmitting pulse and may be partly or "trade-off" matched during range gate reception. In the interval of not transmitting or receiving, the antenna will present a low radar cross section.

13 Claims, 6 Drawing Sheets

U.S. PATENT DOCUMENTS

| | | | | |
|---|---|---|---|---|
| 5,014,070 | A | * | 5/1991 | Stock et al. .................. 342/3 |
| 5,129,099 | A | | 7/1992 | Roberts |
| 5,153,594 | A | | 10/1992 | Moffat |
| 5,307,068 | A | * | 4/1994 | Hartemann ................... 342/1 |
| 5,420,588 | A | * | 5/1995 | Bushman ...................... 342/2 |
| 5,819,164 | A | * | 10/1998 | Sun et al. ..................... 342/6 |
| 5,847,672 | A | * | 12/1998 | James ........................... 342/5 |
| 6,300,894 | B1 | * | 10/2001 | Lynch et al. ................. 342/13 |
| 6,661,368 | B1 | * | 12/2003 | Allen et al. ................... 342/1 |

OTHER PUBLICATIONS

J.L. Lin et al., "Minimization of Backscattering of a Loop by Impedance Loading—Theory and Experiment"; IEEE Transactions on Antennas and Propagation; vol. AP-16, No. 3; May 1968; pp. 299-304.*

K. Hirasawa, "Reduction of Radar Cross Section Section by Multiple Passive Impedance Loadings"; IEEE Journal of Oceanic Engineering; vol. GE-12, No. 2; Apr. 1987; pp. 453-457.*

W. Wiesbeck et al., "Influence of Antennas on the Radar Cross Section of Camouflaged Aircraft"; Proceedings of RADAR '92; Oct. 12-13, 1992; pp. 122-125.*

O.M. Braga Filho et al., "Reduction of the Radar Cross Section of a Moderate Cylindrical Structure Using Central Impedance Loading"; Proceedings of the 2003 Microwave and Optoelectronics Conference; Sep. 20-23, 2003; vol. 1; pp. 461-465.*

D.C. Jenn et al., "Inband Scattering Model For Arrays With Parallel Feed Networks", Antennas and Propagation Society International Symposium, 1994, AP-S Digest on pp. 1870-1873.

B. Thors et al., "Conformal Arrays: Radiation Vs. Scattering Trade-Off", Antennas and Propagation Society International Symposium, Jun. 2002, IEEE on pp. 86-86.

D.C. Jenn et al., "Inband Scattering from Arrays with Series Feed Networks", Antennas and Propagation, IEEE Transations on pp. 867-873.

International Search Report of PCT/SE02/01943 mailed Jun. 2, 2003.

* cited by examiner

DYNAMIC ANTENNA

This application is the US national phase of international application PCT/SE2002/001943 filed 24 Oct. 2002 which designated the U.S., the entire content of which is hereby incorporated by reference.

TECHNICAL FIELD

The present invention relates to antennas for radar systems or communication systems, and more specifically how to effectively reduce the antenna radar cross section for enabling stealth performance.

BACKGROUND

A well-known problem within antenna techniques is how to effectively reduce the radar cross section of an antenna with a minimum effect on antenna performance to thereby enable a stealth performance. One way to circumvent the problem of course is to not use any antennas at all, like for instance the known F117 aircraft. Another possibility is shielding the antenna by means of external frequency selective surfaces (FSS). A third possibility would be to turn away the antenna. However, a turned away antenna can not be used until it is turned back again to the proper direction, which gives an unwanted important negative time factor. Prior art also mentions switched curtains or radomes to be placed in front of an antenna.

A number of documents can be found representing different solutions in connection to the present problem. For instance an U.S. Pat. No. 4,682,176 describes an active transmit/receive module that provides selectable impedance matching between the antenna and the feed lines. The module can be programmed to select a specific impedance when transmitting and another one when receiving.

Another document, U.S. Pat. No. 5,129,099 discloses a tranceiver solution for a radar antenna (array) where one (hybrid mode) phase shifter is used for transmit operations and another for receive operations.

Still another document U.S. Pat. No. 4,117,485 describes a method for reducing, or enhancing, the radar cross section (RCS) by using a load impedance, which may be tuned.

Another recent document WO 02/11239 discloses a multiple band re-configurable reflecting antenna array and a method for multiple band operation and beam steering. An array of dipole antennas is disposed on a multiple band high impedance surface. The antenna array is re-configured by changing the length of the dipole elements, to thereby change the resonant frequency of the dipoles. At a given frequency band, small changes in dipole length allow to steer the reflected beam in a selected direction, while large changes in dipole length result in a switch of operating frequency band.

The U.S. Pat. No. 3,568,194 from 1967 discusses a way in which a return signal can be degraded by using a variable transmission load connected to the reflector. The disclosed method and system comprise phase and/or amplitude modulation of the radar signal by one or more "scattering" sources positioned on a target vehicle, thus causing the return target signal to appear as an incoherent object.

Finally an U.S. Pat. No. 5,153,594 discloses an electronic counter-measure system for installation on an aircraft. The system includes an interferometer transmitter comprising a plurality of repeater amplifier circuits connected in parallel. The plurality of repeater amplifier circuits generate out of phase signals of different amplitudes, which are respectively transmitted by associated spaced transmitting antennas on the aircraft as response to an incoming radar signal.

It is still a demand of further improved solutions to the above-mentioned problem to obtain a feature providing a decreased radar cross section of an antenna without too much effect on antenna performance, to thereby enabling stealth performance.

SUMMARY OF THE INVENTION

It is known that the scattering from an antenna element (such as dipole, small horn etc) depends on the impedance load of the antenna element, i.e. the degree of mismatch (reflection coefficient in amplitude and phase). According to the invention this impedance load is dynamically changed according to the requirements in a particular situation.

Considering military radar installations there are two cases of importance in the operation of an antenna. The first case is when a transmitting pulse is radiated through the antenna. The second case is when a reflected pulse from a target is received. At all other instances the antenna is of no use. The RCS reduction typically leads to an antenna gain reduction as well. This can often be accepted in receive mode, since the competing noise etc in real situations is external to the system, and thus reduced as much as the useful signal. It would therefore be sufficient to "fully open" the antenna only during the transmit pulse, in order not to lose transmit power.

We propose to let the traditional range gate in the receiver and the transmitter trigger-pulse control the antenna. Thus, the antenna is "fully opened", i.e. completely matched only when needed, preferably during a transmit pulse, and "trade-off matched" otherwise. When "trade-off matched" it exhibits low scattering. In an interval of not transmitting or receiving the antenna could preferably be "closed".

A particular implementation makes use of the high voltage in the transmit pulse, causing a gas discharge as in transmit/receive (TR) tubes. This effects automatically the impedance shift, which will then "open" the antenna.

The present invention will enable for instance a fighter aircraft to operate with a minimum risk of being observed by other radar equipment. Still maximum utilization of the aircraft's own radar may instantly take place.

A method according to the present invention is set forth by the independent claim 1, and further embodiments of the invention are set forth by the dependent claims 2 to 6.

Further an antenna arrangement according to the present invention is set forth by the independent claim 7, and further embodiments are defined by the dependent claims 8 to 12.

SHORT DESCRIPTION OF THE DRAWINGS

The invention, together with further objects and advantages thereof, may best be understood by making reference to the following description taken together with the accompanying drawings, in which.

Figure 8:
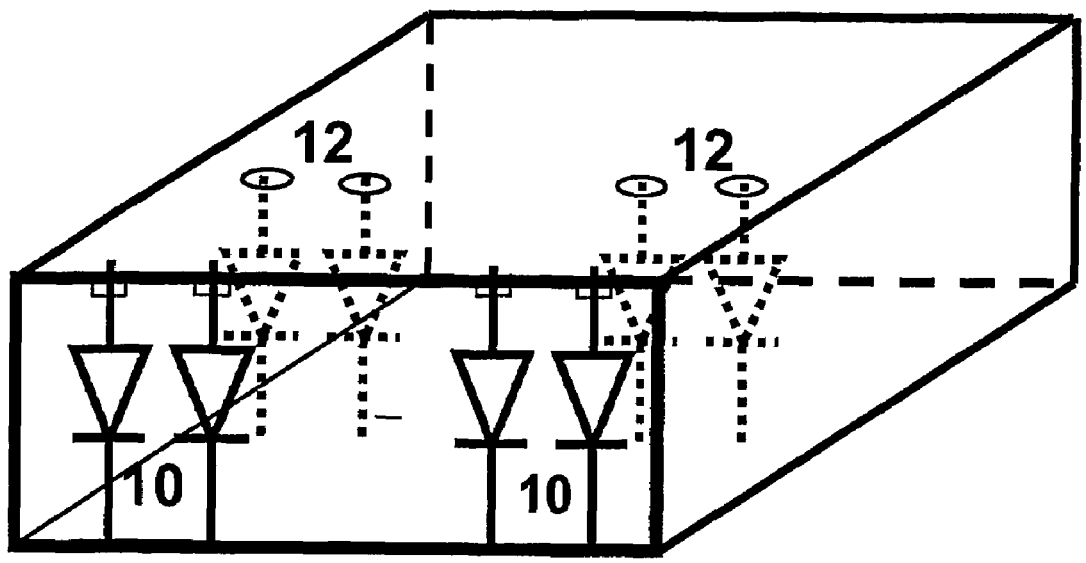
Figure 9:
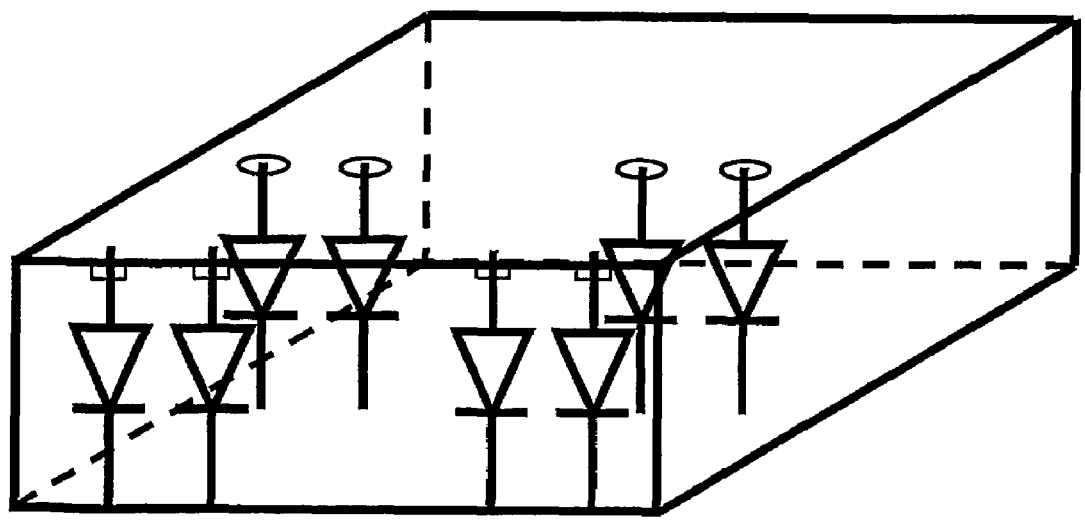
Figure 10:
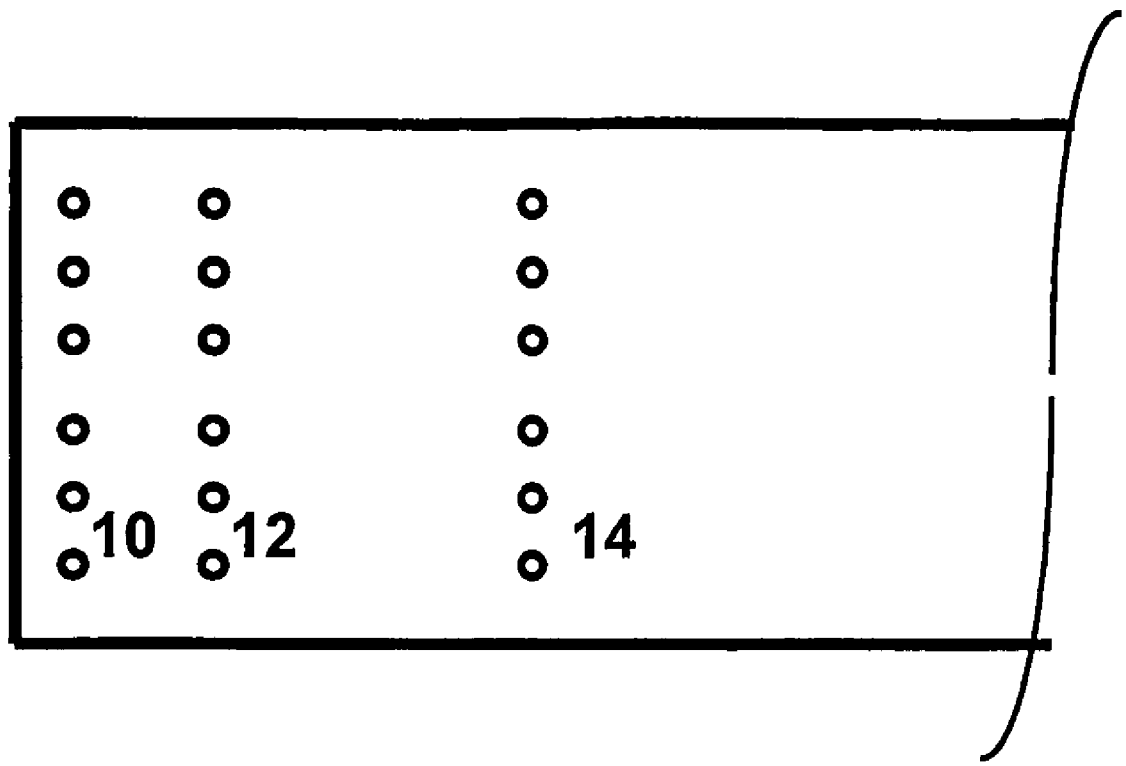

FIG. 8 demonstrates an embodiment having an impedance load divided into two portions of which one is active;

FIG. 9 demonstrates the embodiment of FIG. 8 with for instance both portions activated; and FIG. 10 illustrates an embodiment having the impedance load divided into three portions.

DETAILED DESCRIPTION OF THE INVENTION

A reduction of the radar cross section (RCS) by adjusting the impedance load typically leads to an antenna gain reduction since a mismatch in the feed lines constitutes a loss.

Figure 1:
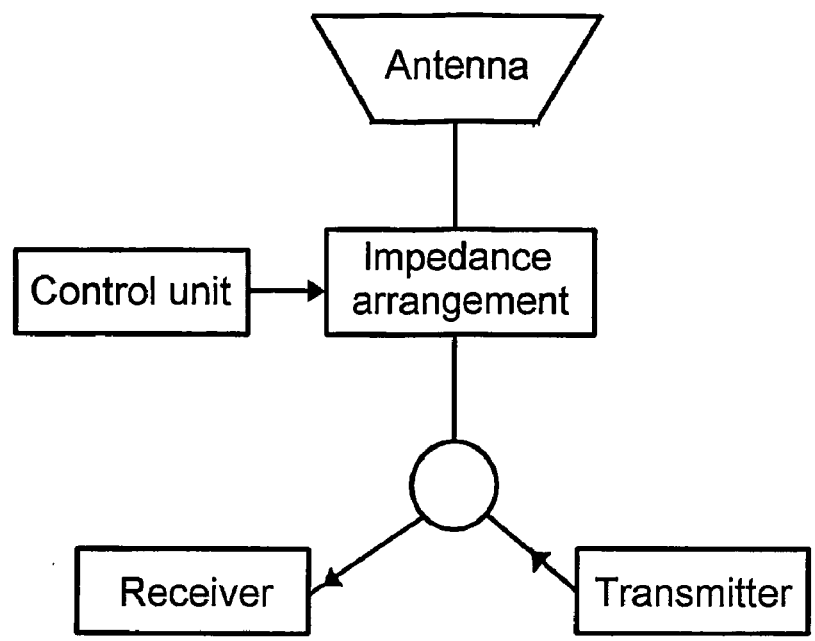
FIG. 1 illustrates a block diagram of an antenna arrangement.

FIG. 1 illustrates in a simple block diagram a device for reducing radar cross section of an antenna arrangement used for a radar installation provided with a pulsed transmitter and a generally gated receiver. A control unit controls an impedance element, which acts as a controlled impedance generally forming an inner tuning device of the antenna arrangement.

Figure 2:
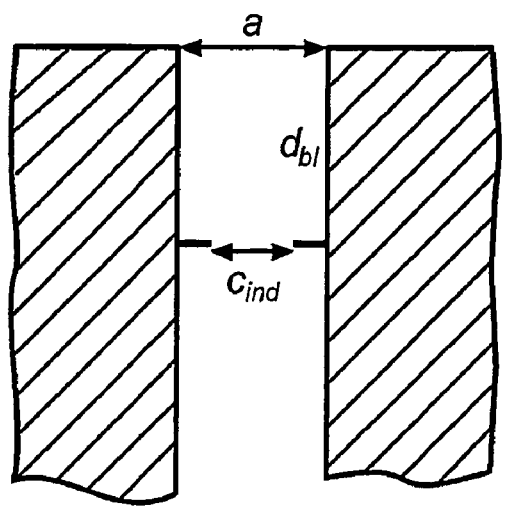
FIG. 2 illustrates a waveguide opening in a ground plane with a tuning device.
Figure 3:
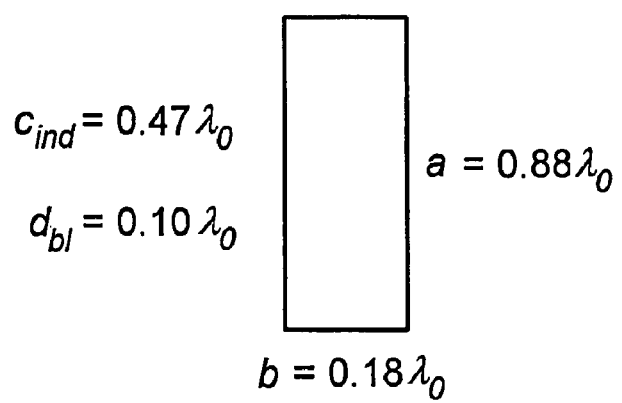
FIG. 3 illustrates parameters used in the exemplifying calculations.

An example presented in FIG. 2 shows an antenna arrangement consisting of a waveguide opening in a ground plane. The waveguide opening may be matched by means of an iris, here chosen to be inductive, with an opening $c_{ind}$ positioned at a distance $d_{bl}$ from the waveguide opening. Several irises or other tuning devices may be used. FIG. 3 illustrates typical parameters for a matched single element at $f_0$=6.8 GHz used in the calculations for illustrating the present application in graphs in FIGS. 4 and 5.

The quality of a matching can be measured by a parameter referred to as S11, which is the reflection factor. Normally values of −10 to −15 dB are desired.

Figure 4:
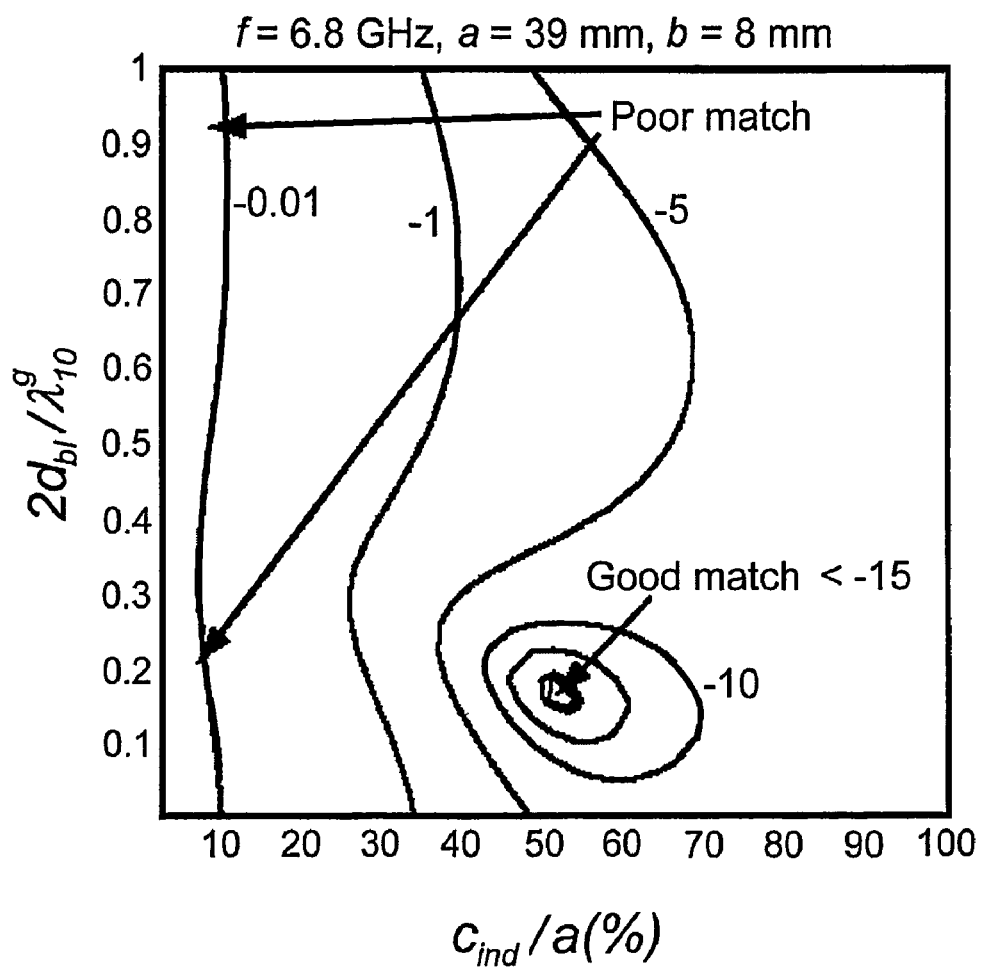
FIG. 4 illustrates the return loss in dB for a single element.
Figure 5:
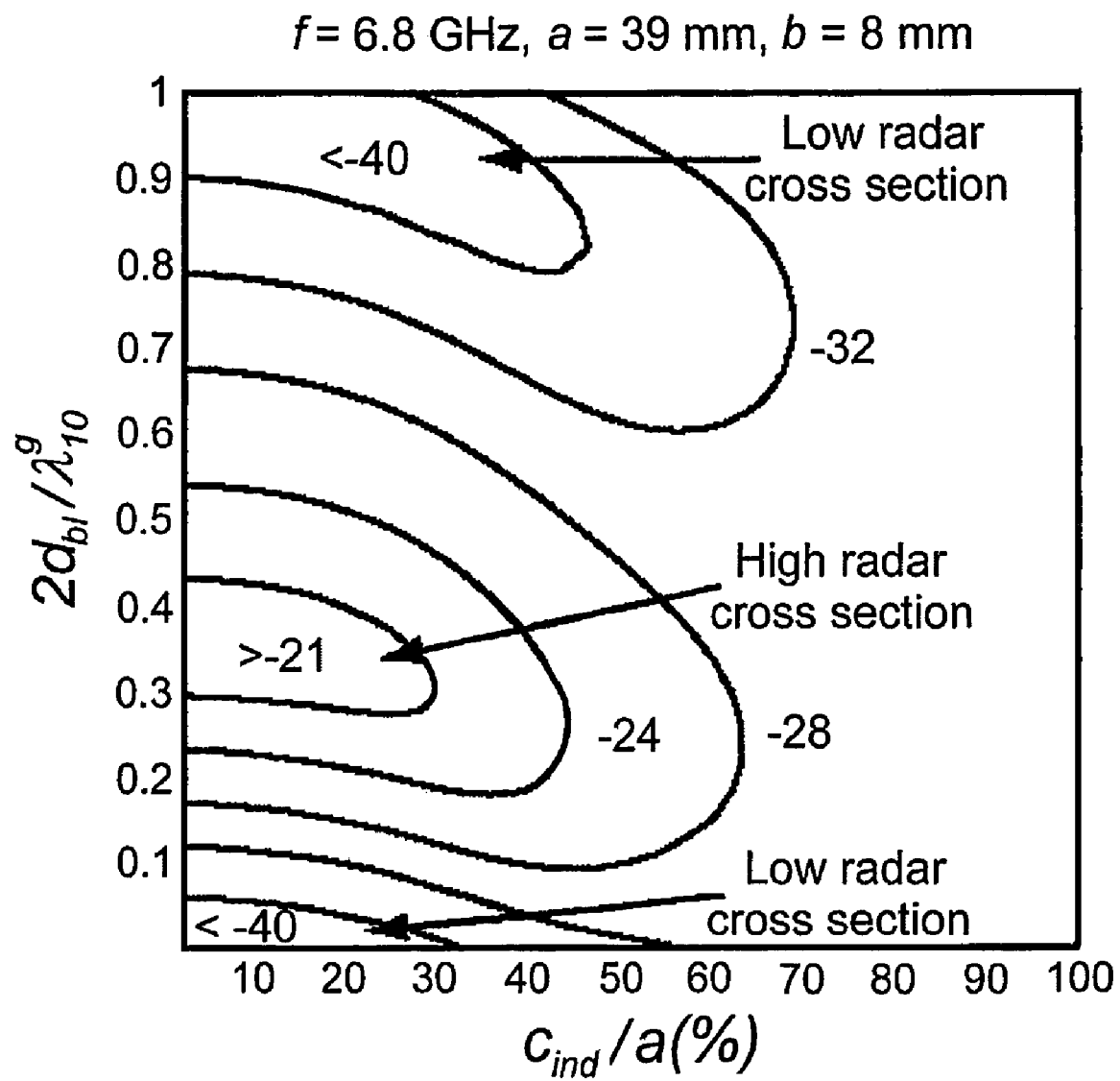
FIG. 5 illustrates the radar cross section in $dB_{sm}$ for a single element.

In FIGS. 4 and 5 the trade-off for a single element is illustrated. FIG. 4 illustrates the influence on the matching (parameter S11) while FIG. 5 illustrates the radar cross section in dB over a square meter ($dB_{sm}$) when $c_{ind}$ and $d_{bl}$ are varied. An optimal point is found by following a direction, which does not increase S11, i.e. along a level curve, and at the same time going across the level lines of the radar cross section ("steepest decent"). A good matching is obtained in the little area pointed to by the rightmost arrow in FIG. 4. As indicated in FIG. 4 a poor match is obtained along the left portion of the graph.

The corresponding radar cross section is demonstrated in FIG. 5. A very low or a very high RCS may be obtained depending on the position of a short-circuit. A low radar cross section is achieved both down to the left and up to the left in FIG. 5. In the lower left corner of FIG. 5 where the aperture is shorted a low RCS is achieved. In the upper left corner of FIG. 5 the short-circuit is placed a distance $\lambda_g/2$ down the waveguide, which explains the low RCS for this case. A shorted waveguide is not acceptable but an iris with an opening of about 33%, placed close to the aperture, reduces the RCS by about 15 dB compared to the best matched case according to FIG. 4. Alternatively the aperture is left fully open reducing the radar cross section by 5 dB. The first example gives a S11 of about −1 dB, i.e. a loss due to a mismatch of 7 dB. That could generally be tolerated in the case of reception when using a suitable transmitting power.

In further embodiment a transmission phase will take place with a portion of the impedance arrangement set to $c_{ind}$=50% at a suitable distance inside the waveguide. Then during a reception phase a $c_{ind}$=33% is used for another portion of the impedance arrangement at a distance quite close to the aperture. Then, during an inactive period, when not transmitting or receiving, the aperture is shorted by making $c_{ind}$=0% at this second portion of the impedance arrangement.

Figure 6:
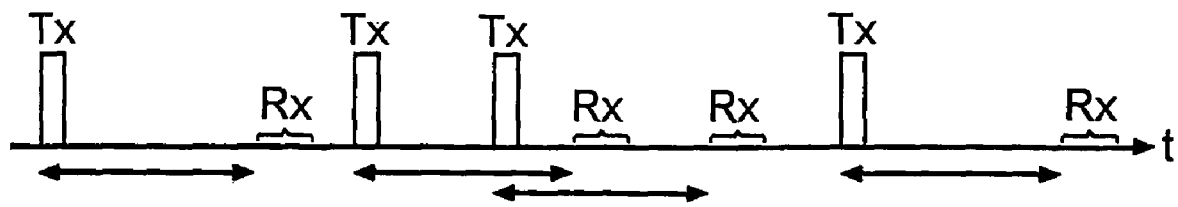
FIG. 6 illustrates the timing of transmit pulses Tx and reception of echo pulses Rx at a controlled range, leaving the antenna in principle closed for the rest of the time.

Operation will be as follows: Upon transmitting the inner tuning device is activated resulting in low losses. Upon reception one tuning device, if more than one, in the aperture may be activated or not. Worse matching, but lower radar cross section is obtained. In this way the radar cross section is low most of the time and only high during the short time when the radar is transmitting. FIG. 6 illustrates radar transmit pulses as a function of time and investigating a target at a certain range indicated by the horizontal arrows. As can be seen from FIG. 6 the pulse repetition rate in a preferred embodiment is continuously varied to prevent simple synchronization by hostile radar equipment.

There are several optional circuitry solutions for the activation of a tuning device used. One example is one or more diodes, which are made conducting or being reversed biased. The diodes are positioned across the waveguide 5 illustrated in FIG. 7 and can provide the desired controlled impedance load, when made to conduct.

Figure 7:
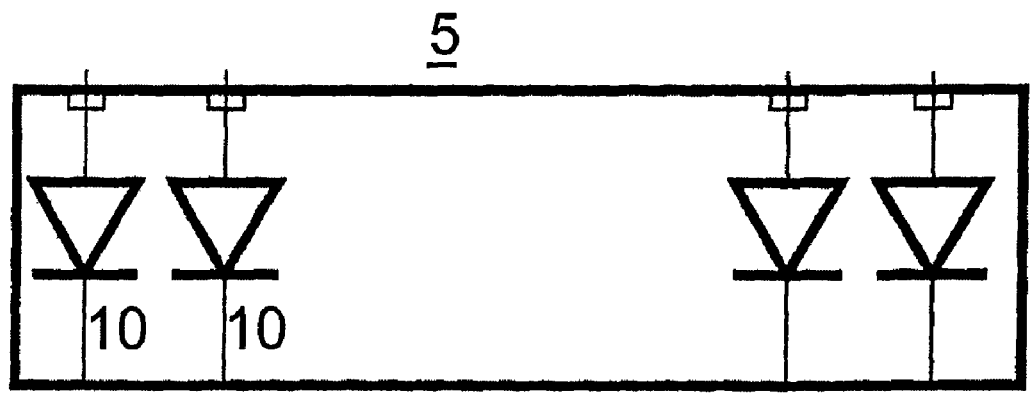
FIG. 7 is an embodiment illustrating a cross section of a rectangular waveguide providing a variable impedance portion.

FIG. 7 illustrates a tuning device, which is activated when its components 10 are activated, here illustrated as diodes, which are forced to conduct. When reverse biasing the diodes, those will generally be capacitive and only impose a smaller effect, while when conducting they will represent a shorted portion of the waveguide cross section. This function can be taken into account in the design by further trimmings.

FIGS. 8 and 9 demonstrate a further embodiment having the impedance load divided into two portions, which may be activated one by one or simultaneously. Activation may be by reverse biasing or forward biasing the elements 10 and 12. In the embodiment shown the iris formed by elements 10 is positioned close to the aperture of a waveguide as previously discussed.

FIG. 10 illustrates in a top view an embodiment having the impedance load divided into three spaced portions 10, 12 and 14. In operation at least three different states may be obtained. A first fully matched state for transmission, a second "trade-off matched" state for reception providing a lower RCS for a hostile radar and finally a third state with the antenna "closed" providing a lowest possible RCS of the antenna.

From the central control unit of the radar the bias voltage of the diodes are for instance commanded in synchronism with the triggering of the transmitting or receiving events.

In a different embodiment the impedance load component could in certain cases for instance be replaced by gas discharge tubes, which automatically will be "ignited" by the transmit pulse itself and thereby match the antenna arrangement to present a low loss for the transmit pulse.

Upon radar tracking of a target at a certain distance it is already known when to expect the echo to return. It would then be possible to keep the aperture fully closed after the transmitting pulse until the proper time for the echo to return back to the radar receiver.

The system according to the present invention enables for instance a fighter or reconnaissance aircraft to operate without being too easily observed by other radar facilities. Still full use of the own radar of the aircraft may take place.

It will be understood by those skilled in the art that various modifications and changes may be made to the present invention without departure from the scope thereof, which is defined by the appended claims.

The invention claimed is:

1. A method for reducing radar cross section of an antenna arrangement, comprising:
   dynamically controlling an impedance load of the antenna arrangement to thereby reduce scattering of a signal from an external source irradiating the antenna arrangement, wherein dynamically controlling of the impedance load includes changing a reflection coefficient of the antenna arrangement;
   fully matching the impedance load of the antenna arrangement during a transmit period including a transmit pulse from the antenna arrangement,
   obtaining at least a trade-off matching of the impedance load of the antenna arrangement during a defined receive period, and
   providing a very poor matching of the impedance load of the antenna arrangement during an inactive time period excluding the transmit and receive periods,
   wherein the antenna arrangement presents a low radar cross section during said inactive period with a correct phase in an operating frequency band.

2. The method according to claim 1, characterized by the further steps of:
   triggering, at non periodic intervals, the dynamically controlled impedance load of the antenna arrangement by a transmit pulse to obtain a full frequency matching and thereby a low power loss during the transmit pulse; and
   triggering, at non-periodic intervals corresponding to a desired range gate, the dynamically controlled impedance load to a trade-off matching for reception of echoes at a desired distance, actively reducing undesired scattering from the antenna arrangement during all other periods.

3. The method according to claim 2, characterized by the further step of:
   generating the dynamically controlled impedance by means of at least one controlled inner tuning device by controlling the inner tuning device during transmit and receive periods as well as during the period when not actively transmitting or receiving.

4. The method according to claim 3, characterized by the further step of:
   creating the inner tuning device by the use of a switched impedance arrangement being appropriately switched to fully or partly conducting during respective phases of operation and a proper part of the impedance arrangement being non-conducting during the rest of the time.

5. The method according to claim 3, characterized by the further step of:
   creating the inner tuning device by means of an impedance arrangement having a portion with at least one diode which is forward biased during at least a transmission phase, and a second portion of the impedance arrangement being forward biased during the rest of the time.

6. The method according to claim 3, characterized by the further step of:
   creating an inner tuning device by means of an impedance arrangement being at least one gas discharge tube ignited by the transmit pulse.

7. The method according to claim 1, characterized by the further steps of:
   creating by means of the impedance load of the antenna arrangement a first state being fully matched for transmission, a second state being trade-off matched for reception providing a lower antenna radar cross section and a third state with the antenna being closed providing a lowest possible radar cross section of the antenna when not in use.

8. An antenna arrangement for reducing radar cross section, comprising:
   an antenna in a radar installation,
   an impedance arrangement connected to the antenna, and
   a control unit, connected to the impedance arrangement, for changing an impedance load of the antenna arrangement to thereby reduce scattering of a signal from an external source irradiating the antenna arrangement,
   wherein the control unit is configured to change the impedance load of the antenna arrangement by changing a reflection coefficient of the antenna arrangement between:
      fully matching the impedance load of the antenna arrangement during a transmit period including a transmit pulse originating from a transmitter in the antenna arrangement,
      a trade-off matching the impedance load of the antenna arrangement during a defined receive period in the antenna arrangement, and
      a poor matching of the impedance load of the antenna arrangement during an inactive time period excluding the transmit and receive periods that causes the antenna arrangement to present a low radar cross section during said inactive period.

9. The antenna arrangement according to claim 8, characterized in that the controlled impedance load is triggerable, at non periodic intervals, by a transmit pulse to obtain a full frequency matching and thereby a low power loss during the transmit pulse, and
   the controlled impedance load is triggerable, at a desired range gate, to at least a trade-off matching for reception of echoes at a desired distance, to actively reduce undesired scattering from the antenna arrangement during reception and reducing radar cross section of the antenna during inactive periods of no transmission or reception.

10. The antenna arrangement according to claim 9, characterized in that the controlled impedance includes at least one controlled inner tuning device controllable during transmit and receive periods as well as during a period of not actively transmitting or receiving.

11. The antenna arrangement according to claim 10, characterized in that the inner tuning device includes at least one switched impedance arrangement which can be switched to fully or partly conducting during respective phases of operation and can be switched to a state closing the antenna during the rest of the time.

12. The antenna arrangement according to claim 10, characterized in that the inner tuning device forming the impedance arrangement includes at least one diode, which is biased forward during an active phase of operation and being back-biased during the rest of the time.

13. The antenna arrangement according to claim 10, characterized in that the inner tuning device forming the impedance arrangement includes at least one gas discharge tube being ignited by the transmit pulse.

* * * * *